April 21, 1936.  A. E. BRONSON  2,038,473
VALVE STEM
Filed Sept. 28, 1932
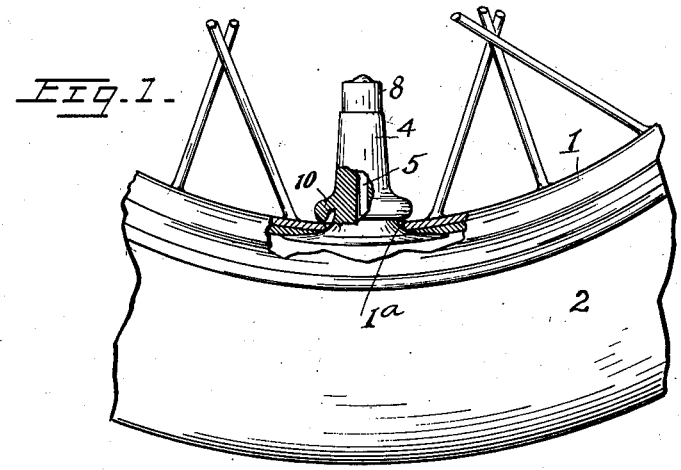
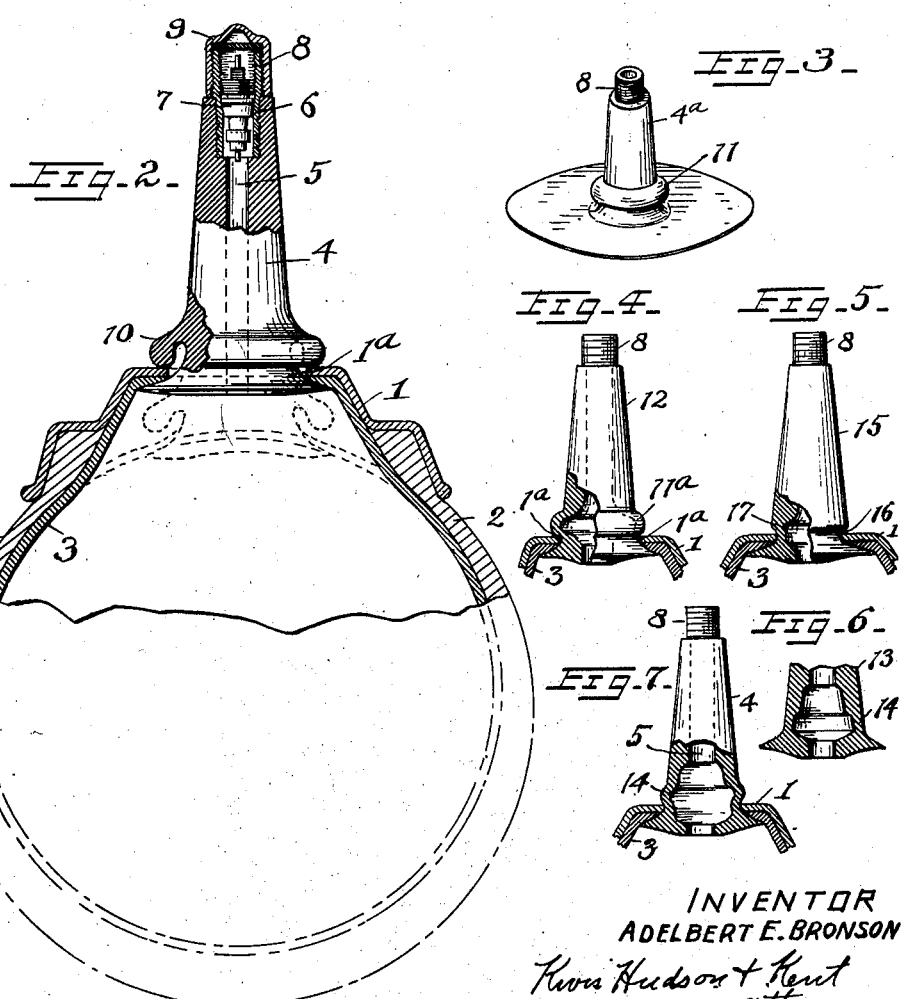
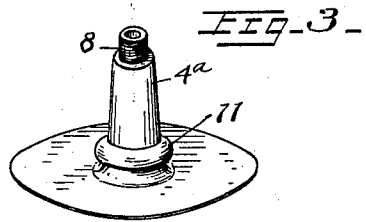
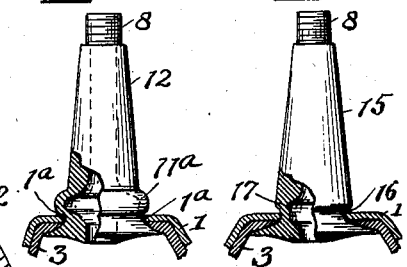
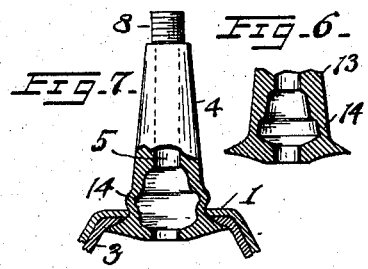
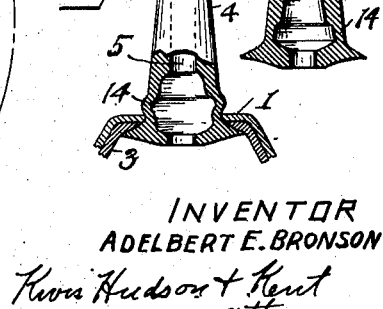
INVENTOR
ADELBERT E. BRONSON.

Patented Apr. 21, 1936

2,038,473

UNITED STATES PATENT OFFICE 2,038,473

VALVE STEM

Adelbert E. Bronson, Shaker Heights, Ohio, assignor to The Dill Manufacturing Company, Cleveland, Ohio, a corporation of Ohio Application September 28, 1932, Serial No. 635,213

6 Claims. (Cl. 152—12)

The present invention relates to valve stems for use in connection with pneumatic tires and devices of similar character.

It is customary practice at the present time to use, in connection with the inner tube of a pneumatic tire, a metal valve stem which is adapted to cooperate with a suitable opening in the inner tube, to which inner tube the valve stem is secured by metal parts firmly clamping the portion of the inner tube surrounding the opening through which the valve stem extends, so that the valve stem is secured to the inner tube and air may be passed through the valve stem for the purpose of inflating the inner tube.

When the usual pneumatic tire is mounted upon the rim of a wheel, such as an automobile wheel, the valve stem extends through a hole or opening in the rim, thus making the valve stem available for inflating purposes. When the tire becomes deflated, as due to a puncture or other accident, unless the car on which the tire is mounted be stopped immediately, which is usually quite impossible, the deflated inner tube tends to pull the valve stem through the opening in the rim and into the casing. Under such circumstances sometimes the valve stem is bent, making it useless, and again it may be drawn into the casing, in which event it severely damages the inner tube.

With the advent of the low pressure balloon tires, and with the advent of the rim known as the drop center rim, the difficulties which have just been mentioned are magnified.

It has been proposed to use a valve stem made of rubber, which instead of being clamped to the inner tube, may be vulcanized directly thereto so that in the event of deflation of the inner tube, the valve stem being of rubber, will yield and readily pass through the valve stem opening in the wheel rim, thus avoiding any damage to the stem, and even though the stem be drawn inside of the casing, the valve stem being of rubber will not produce any damage to the inner tube.

In connection with the use of such a rubber valve stem it is difficult to inflate an inner tube when the same is mounted upon a wheel because of the fact that there being little or no air pressure within the inner tube, there is nothing to hold the valve stem in its projected position through the hole in the rim of the wheel. Consequently upon the application of the usual air chuck for inflating the tire, it is necessary for the operator to hold the valve stem with one hand, while he applies the air chuck to the end of the stem for purposes of inflating it.

Also in connection with the use of a flexible valve stem, such as a rubber valve stem, it is desirable to have some means associated with the valve stem which will serve to yieldingly hold the valve stem in its inserted position through the valve stem opening in the rim and thus overcome any difficulty attendant upon the tendency of such a stem to pull through the opening in the rim under normal conditions.

For the purpose of overcoming these difficulties it is the object of this invention to provide a valve stem of the character to which reference has been made, with means associated therewith which will hold the valve stem in position with respect to the rim, after the valve stem has been inserted through the hole in the rim, and yet will yieldingly hold the valve stem so that in the event of deflation of the tire, the valve stem may be drawn through the hole in the rim without injury to the valve stem.

Reference should be had to the accompanying drawing forming a part of this specification in which, Figure 1 is an elevation with portions in section showing a part of a pneumatic tire mounted on a vehicle wheel in which the stem embodies the present invention.

Fig. 2 is a sectional elevation of the rim, casing, inner tube and valve stem embodying the present invention.

Fig. 3 is a perspective view showing a valve stem equipped with a modified form of the present invention.

Fig. 4 is a partial elevation with portions in section of a modified form of the invention.

Fig. 5 is a partial elevation with portions in section showing a modified form of the invention.

Fig. 6 is a fragmentary sectional view of a flexible valve stem embodying a modification of the invention.

Fig. 7 is a partial elevation with portions in section of the modification shown in Fig. 6.

Referring to the drawing, the rim of the wheel is designated by the reference character 1, 2 is the tire casing which will be of usual form and 3 is an inner tube of usual form. The inner tube is equipped with a valve stem 4 which is made of rubber or suitable flexible material, which valve stem is, by suitable means, directly vulcanized or secured to the inner tube. The valve stem 4 has a central air passage 5 and at the outer end thereof there is a metal piece 6 inserted within the valve stem for the purpose of receiving a valve insides 7 which may be of well known form, and the part 6 has an extension 8 which is threaded upon the outside to receive a valve cap 9.

As shown in Fig. 2 the valve stem 4 is provided with an umbrella-like extension 10, which is made of flexible material and if of somewhat greater diameter than the diameter of the valve stem. In fact this umbrella-like extension 10 is of greater diameter than the valve stem opening 1ª which is formed in the rim 1.

In assembling a casing and inner tube equipped with a valve stem embodying the present invention upon the rim of a wheel, the casing and the inner tube will be positioned with respect to the rim so that the valve stem may be pulled through the opening 1ª in the rim. Inasmuch as the valve stem 4 and the umbrella-like extension 10 are of flexible material, the valve stem may be pulled through the opening 1ª and during such operation the extension 10 will be compressed and may be pulled through the opening 1ª, but as soon as it has passed the opening 1ª it will resume its normal position and the extension 10 will engage with the inner surface of the rim 1, thus holding the valve stem in position so that an inflating chuck may be applied to the end of the valve stem for inflating purposes without making it necessary for the operator to use one hand in holding the stem in position during the inflation operation.

It will be obvious that inasmuch as the extension 10 is of flexible material, in the event of the inner tube becoming deflated as by puncture or other accident, any movement of the inner tube within the casing will not be materially prevented by the valve stem, but the extension 10 will merely be compressed as the valve stem is pulled into the casing.

It will be obvious that the extension 10 which is shown in Fig. 2 may be of various configurations, and in Fig. 3 the valve stem 4ª is equipped with a rounded extension 11 instead of what I call an umbrella-like extension, as shown in Fig. 2. However, the same characteristics with respect to holding the valve stem when it is drawn through the opening in the rim, and permitting the pulling of the valve stem within the rim, will exist in the construction shown in Fig. 3 the same as with respect to the construction shown in Fig. 2.

It is desirable, in the use of a flexible valve stem such as a rubber valve stem, that when the valve stem has been inserted through the usual valve stem opening in a rim, and the inner tube is under inflation, that there shall be no tendency for the valve stem to be drawn through the opening in the rim, due to any creeping action of the inner tube, within the tire casing, as the wheel rotates in the use of the vehicle upon which the tire is mounted.

In the usual form of metal valve stem this tendency is overcome by the use of a rim nut which is threaded upon the valve stem but, of course, with a valve stem made of flexible material the usual rim nut practice is not available.

It is, of course, true that the projection 10 or the projection 11, upon the valve stem, such as suggested in the construction shown in Figs. 2 and 3, respectively, would function for the purpose to which reference has just been made.

But in order to enhance the effectiveness I have shown in Fig. 4 a modification of the construction shown in Fig. 3, wherein the annular extension 11 is, so to speak, made hollow, that is to say it forms an enlarged chamber which is in communication with the central air passage of the stem.

When the tube is not inflated and the stem is drawn through the usual valve stem hole or opening in the rim, the projection 11ª of the valve stem 12 will be compressed and as soon as the stem has been completely drawn through the hole in the rim the natural expansion of the material will cause the extension 11ª to overlap the edge of the opening in the rim.

When the inner tube is inflated the pressure of the air is effective within the valve stem and presses against the inner walls of the extension 11ª, thus materially stiffening the projection 11ª and so forming, what might be termed, an increased resistance to any tendency of the creeping of the inner tube, to pull the valve stem through the rim opening.

This stiffening of the extension 11ª, due to the air pressure within the tube, will be extant as long as the tube remains inflated, but if the tube becomes deflated, as by puncture or otherwise, the air pressure diminishes to atmospheric pressure, and therefore the reinforcement, due to air pressure, for the projection 11ª has been withdrawn and it will be perfectly possible for the stem to pass through the opening in the rim.

It will be obvious that the special feature which has been described with respect to Fig. 4 can be applied to the construction shown in Fig. 2 with equal facility.

Referring to Figs. 6 and 7, the valve stem 13 is provided with an enlarged chamber, the walls of which adjacent the part which would normally lie within the usual valve stem opening in a tire rim, as indicated at 14, are somewhat thinner, or, what might be said, are somewhat more flexible than the other portions of the stem. When such a stem is drawn through the opening in the usual valve stem opening in the rim, and the inner tube is placed under inflation, there will be a slight bulging of the wall portion 14, causing it to expand and underlie the edge of the opening in the rim as indicated in Fig. 17.

In connection with the use of such a stem it would normally be made so that the lower portion of the stem is of greater diameter than the opening in the rim through which it is adapted to be passed, so that as the tire stem is drawn through the opening in the rim, prior to inflation of the inner tube, the frictional engagement between the stem and the edge of the hole in the rim, will serve to retain the stem in its position during the time that the tire is not inflated.

After inflation the frictional engagement, before described, is reinforced or augmented, so far as its effect in retaining the valve stem upon the rim is concerned, by the expansion of the wall 14, as just described.

In Fig. 5, the flexible valve stem 15 is, adjacent the inner end thereof, provided with a re-entrant groove 16 which is of such diameter with respect to the size of the usual valve stem opening in the rim, that when the valve stem is drawn through the rim, with the inner tube in uninflated condition, the rubber or the material of the valve stem just above the groove will be compressed as the stem is drawn through the opening, and then the edge of the opening in the rim will occupy the groove 16. This will serve to hold the valve stem during the time that the inner tube is being inflated.

It will be noted that the central passageway through the stem is enlarged somewhat adjacent the groove 16, as indicated at 17. When the inner tube has been inflated to the proper air pressure, this air pressure will assist also in the chamber 17 and will tend to stiffen the wall of the chamber 17, thus enhancing the retaining effect of the groove 16.

It will be apparent that other modifications of the underlying construction which is described in this specification, may be made without departing from the spirit of the invention.

Having thus described my invention, I claim:

1. A valve stem of flexible material with which means are associated adapted to retain said stem extended when inserted through the valve stem opening of a tire rim, said means being reinforced and stiffened by the air pressure when the tire with which the valve stem is used is inflated.

2. A valve stem of flexible material provided with a resilient part adapted to engage with the portion of a tire rim surrounding the usual valve stem opening to thereby retain the valve stem extended with respect to the rim, the said stem being provided with a central air passageway and having an enlarged chamber communicating therewith adjacent the resilient part whereby when the tire with which the valve stem is associated is inflated the air pressure will stiffen the said part.

3. A valve stem adapted to be connected to the inner tube of a tire and to extend through the usual opening in the tire rim, said stem being formed of flexible material and decreasingly tapered from adjacent its inner end to its outer end and provided with a bore extending therethrough, a portion of said bore adjacent such inner end being of enlarged diameter and providing said stem with a thin section wall zone adjacent the inner end of the stem whereby said zone will have increased flexibility and will be expanded laterally of the stem when the tube is inflated to overlie the inner side of the rim adjacent the opening and to maintain said stem normally in extended position.

4. A valve stem adapted to be connected to the inner tube of a tire and to extend through the usual opening in the tire rim and formed of flexible material and provided with a bore extending therethrough, a portion of said bore adjacent the inner end of the stem being of enlarged diameter and providing said stem with a thin section wall zone whereby said zone will have increased flexibility and will be expanded laterally of the stem when the tube is inflated to overlie the inner side of the rim adjacent the opening and to maintain said stem normally in extended position.

5. A valve stem adapted to be connected to the inner tube of a tire and to extend through the usual opening in the tire rim and formed of resilient material and provided with a bore extending from end to end of the stem, said stem adjacent its inner end being provided with a laterally projecting annular hollow bead in communication with said bore whereby said bead will be expanded laterally of the stem and stiffened by the air pressure when the tube is inflated and will overlie the inner side of the rim adjacent the opening to maintain said stem normally in extended position.

6. A valve stem adapted to be connected to the inner tube of a tire and to extend through the usual opening in the tire rim and having a portion adjacent the inner end of the stem formed of resilient material and provided with a laterally projecting annular hollow bead, said stem being provided with a bore extending therethrough from end to end and in communication with said bead whereby said bead will be expanded laterally of the stem and stiffened by the air pressure when the tube is inflated to overlie the inner side of the rim adjacent the opening to maintain said stem normally in extended position.

ADELBERT E. BRONSON.